US012614115B2

(12) United States Patent
Maiti et al.

(10) Patent No.: US 12,614,115 B2
(45) Date of Patent: Apr. 28, 2026

(54) SYSTEMS AND METHODS FOR INDICATOR IDENTIFICATION

(71) Applicant: ADOBE INC., San Jose, CA (US)

(72) Inventors: Aurghya Maiti, Kolkata (IN); Iftikhar Ahamath Burhanuddin, Karnataka (IN); Atanu R. Sinha, Kodbisanahalli (IN); Saurabh Mahapatra, Sunnyvale, CA (US); Fan Du, Milpitas, CA (US)

(73) Assignee: ADOBE INC., San Jose, CA (US)

( * ) Notice: Subject to any disclaimer, the term of this patent is extended or adjusted under 35 U.S.C. 154(b) by 779 days.

(21) Appl. No.: 18/152,879

(22) Filed: Jan. 11, 2023

(65) Prior Publication Data

US 2024/0232702 A1     Jul. 11, 2024

(51) Int. Cl.
G06N 20/00 (2019.01)

(52) U.S. Cl.
CPC .................................... G06N 20/00 (2019.01)

(58) Field of Classification Search
None
See application file for complete search history.

(56) References Cited

U.S. PATENT DOCUMENTS

| | | | | |
|---|---|---|---|---|
| 6,928,398 | B1 * | 8/2005 | Fang ........................ | G06F 17/18 |
| | | | | 703/2 |
| 8,423,454 | B2 * | 4/2013 | Chen .................... | G06Q 10/067 |
| | | | | 705/38 |
| 10,185,893 | B2 * | 1/2019 | Townsend ................ | G06N 3/04 |
| 10,360,527 | B2 * | 7/2019 | Abe ...................... | G06Q 10/067 |
| 10,671,931 | B2 * | 6/2020 | Bansal ................... | G06N 20/00 |
| 10,909,095 | B2 * | 2/2021 | Suleiman .............. | H04L 41/142 |
| 11,093,837 | B2 * | 8/2021 | Oliner .................... | G06F 16/26 |

(Continued)

FOREIGN PATENT DOCUMENTS

| | | |
|---|---|---|
| CN | 109711714 | 5/2019 |
| CN | 111915892 | 11/2020 |
| WO | 2019051701 | 3/2019 |

OTHER PUBLICATIONS

Final Office Action dated Mar. 16, 2023 in corresponding U.S. Appl. No. 17/329,934.

(Continued)

*Primary Examiner* — Maikhanh Nguyen
(74) *Attorney, Agent, or Firm* — F. CHAU & ASSOCIATES, LLC

(57) ABSTRACT

One aspect of a method for data processing includes identifying target time series data for a target metric and candidate time series data for a plurality of indicators predictive of the target metric; training a machine learning model to predict the target time series data based on the candidate time series data; computing first through third predictivity values based on the machine learning model, wherein the first predictivity value indicates that a source indicator from the plurality of indicators is predictive of the target metric, the second predictivity value indicates that an intermediate indicator from the plurality of indicators is predictive of the target metric, and the third predictivity value indicates that the source indicator is predictive of the intermediate indicator; and displaying a portion of the candidate time series data corresponding to the intermediate indicator and the source indicator based on the first through third predictivity values.

20 Claims, 6 Drawing Sheets

(56)     References Cited

U.S. PATENT DOCUMENTS

| | | | | |
|---|---|---|---|---|
| 11,262,743 | B2 * | 3/2022 | Shetty B | G05B 23/0289 |
| 11,429,653 | B2 * | 8/2022 | Palanciuc | G06N 20/00 |
| 11,443,015 | B2 * | 9/2022 | Modarresi | G06Q 30/02 |
| 11,769,100 | B2 * | 9/2023 | Sinha | G06Q 10/06393 |
| | | | | 705/7.39 |
| 11,829,855 | B2 * | 11/2023 | Shrivastava | G06F 16/90335 |
| 11,935,077 | B2 * | 3/2024 | Kaveetil | G06Q 30/0202 |
| 2012/0173399 | A1 | 7/2012 | Chen et al. | |
| 2016/0142266 | A1 * | 5/2016 | Carroll | H04L 41/14 |
| | | | | 706/12 |
| 2017/0220939 | A1 * | 8/2017 | Bansal | G06N 5/04 |
| 2018/0046926 | A1 * | 2/2018 | Achin | G06N 5/02 |
| 2018/0218269 | A1 | 8/2018 | Oliner et al. | |
| 2018/0300621 | A1 | 10/2018 | Shah et al. | |
| 2020/0159203 | A1 | 5/2020 | Shetty et al. | |
| 2020/0257992 | A1 * | 8/2020 | Achin | G05B 17/02 |
| 2021/0350175 | A1 * | 11/2021 | Chauhan | G06N 3/04 |
| 2022/0188383 | A1 * | 6/2022 | Doan Huu | G06N 20/00 |
| 2022/0383224 | A1 * | 12/2022 | Sinha | G06F 18/214 |
| 2023/0012177 | A1 * | 1/2023 | Ghalyan | G06N 20/20 |

OTHER PUBLICATIONS

Talebi, et al., "Finding Leading Indicators of Fatigue in Operational Data Sets", Department of Mining Engineering, University of Utah, Salt Lake City, UT 84112, USA 2021, (Year: 2021).

Babecky, et al., "Leading Indicators of Crisis Incidence Evidence from Developed Countries", European Central Bank, Working Paper Series No. 1486 / Oct. 2012. (Year: 2012).

Stock, et al., "Forecasting with Leading Indicators: Lessons from the 1990 Recession in the United States", Prepared for the meeting of the Ekonomiska Radet, Konjunkturinstitutes, Stockholm, Sweden. Oct. 5-6, 1992. (Year: 1992).

Gregorova, et al., "Learning Predictive Leading Indicators for Forecasting Time Series Systems with Unknown Clusters of Forecast Tasks", Geneva school of Business Administration, HES-SO University of Applied Sciences of Western Switzerland. Proceedings of Machine Learning Research 77: 161-176, 2017. (Year: 2017).

St. Louis Fed, "Leading Indicator Series", Nov. 21, 2022, available at https://fred.stlouisfed.org/tags/series?t=leading+indicator, 7 pages.

Petnehazi, "Recurrent Neural Networks for Time Series Forecasting", arXiv preprint arXiv:1901.00069v1 [cs.LG] Jan. 1, 2019, 22 pages.

Federal Reserve Bank of New York, "The Yield Curve as a Leading Indicator", Nov. 21, 2022, available at https://www.newyorkfed.org/research/capital_markets/ycfaq.html#/, 1 page.

Schrage, et al., "Leading With Next-Generation Key Performance Indicators", Jun. 26, 2018, available at https://sloanreview.mit.edu/projects/leading-with-next-generation-key-performance-indicators/, 6 pages.

McGuckin, et al., "The Composite Index of Leading Economic Indicators: How to Make It More Timely", National Bureau of Economic Research Working Paper 8430, Aug. 2001, 32 pages.

Stock, et al., "New Indexes of Coincident and Leading Economic Indicators", NBER Macroeconomics Annual 1989, vol. 4, Mar. 10, 1989, pp. 351-409, 60 pages.

Mostaghimi, "Monetary Policy, Composite Leading Economic Indicators and Predicting the 2001 Recession", Journal of Forecasting, 23(7), 463-477, Oct. 29, 2004, available at https://onlinelibrary.wiley.com/doi/abs/10.1002/for.923.

Borden, et al., "Gauging internal efficiency and effectiveness with leading and lagging indicators", Dec. 14, 2017, available at https://www.mckinsey.com/business-functions/operations/our-insights/gauging-internal-efficiency-and-effectiveness-with-leading-and-lagging-indicators, 5 pages.

Pai, et al., "A hybrid ARIMA and support vector machines model in stock price forecasting", Omega, 33 (2005), pp. 497-505, Sep. 16, 2004, 9 pages.

Trask, "To Build A Better Marketing Plan, Revisit Your Approach To Planning", Sep. 2, 2021, available at https://www.forrester.com/blogs/dynamic-marketing-planning/, 9 pages.

Mawhinney, "What is a KPI? How To Choose the Best KPIs for Your Business", Sep. 28, 2022, available at https://blog.hubspot.com/marketing/choosing-kpis, 29 pages.

Yeo, "How Will You Measure Your Digital Success?", Dec. 6, 2021, available at https://blogs.gartner.com/gladys-yeo/2021/12/06/how-will-you-measure-your-digital-success/, 5 pages.

Coelho, "This is How Often You Really Should Track Each of Your Marketing Metrics in 2019", Feb. 22, 2018, available at https://www.impactplus.com/blog/how-often-track-marketing-metrics, 16 pages.

Patel, "How Long Does It Take to See Digital Marketing Results?", Sep. 2, 2016, available at https://www.linkedin.com/pulse/how-long-does-take-see-digital-marketing-results-neil-patel, 12 pages.

Alexander, "The Who, What, Why, & How of Digital Marketing", Aug. 24, 2022, available at https://blog.hubspot.com/marketing/what-is-digital-marketing, 40 pages.

Rahal, "Measuring Success: Six Digital Marketing Metrics and KPIs For 2021", Apr. 28, 2021, available at https://www.forbes.com/sites/forbescommunicationscouncil/2021/04/28/measuring-success-six-digital-marketing-metrics-and-kpis-for-2021/?sh=6149818e6172, 6 pages.

Webfx, "14 Digital Marketing Metrics to Measure", Nov. 21, 2022, available at https://www.webfx.com/digital-marketing/learn/digital-marketing-metrics/, 24 pages.

Iyetomo, et al., "Relationship between Macroeconomic Indicators and Economic Cycles in U.S.", Scientific Reports vol. 10, Article 8420, May 21, 2020, 12 pages.

Guo, et al., "Exploring Interpretable LSTM Neural Networks over Multi-Variable Data", arXiv preprint arXiv:1905.12034v1 [cs.LG] May 28, 2019, 17 pages.

* cited by examiner

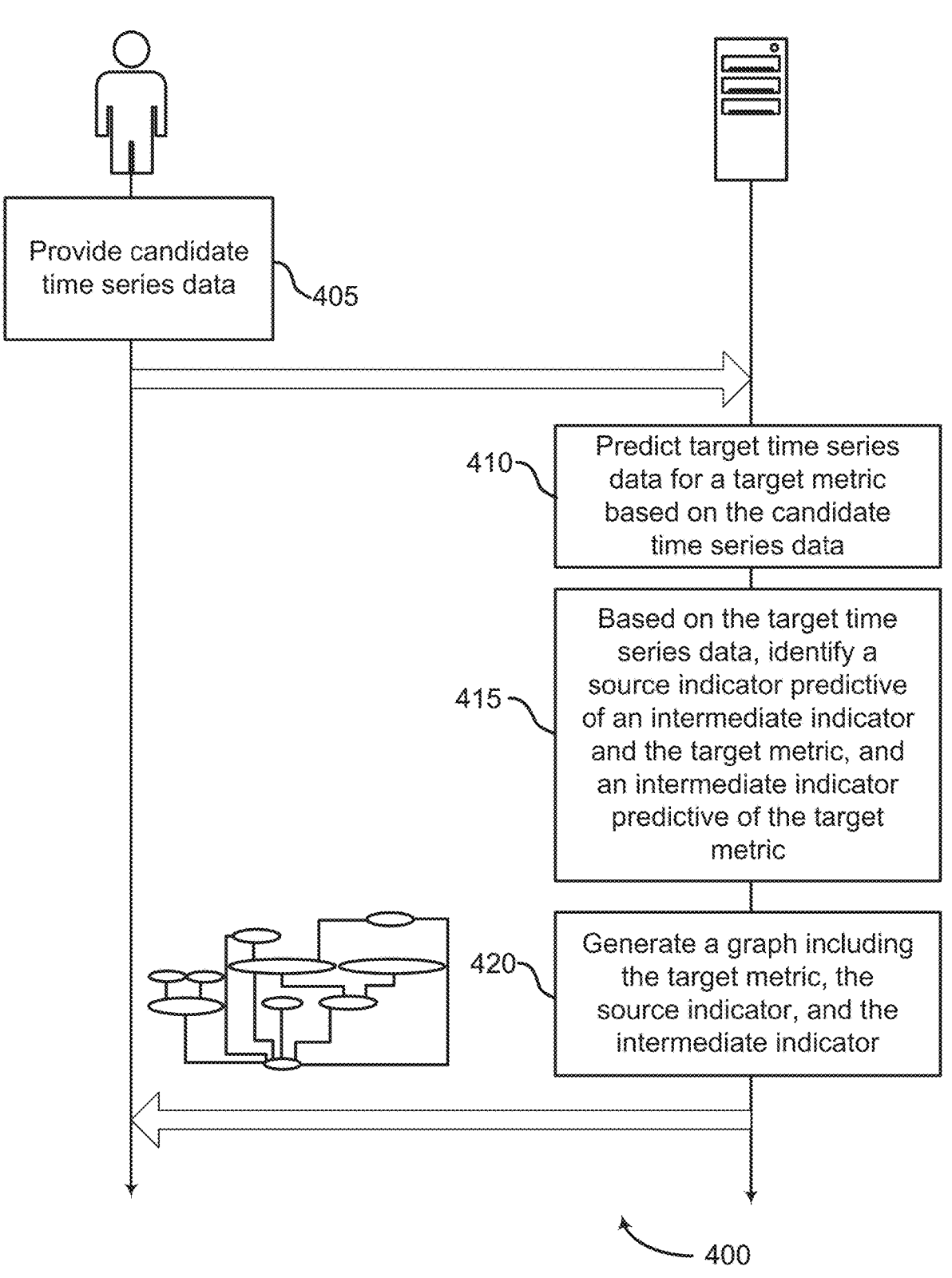

Provide candidate time series data —405

Predict target time series data for a target metric based on the candidate time series data 410

Based on the target time series data, identify a source indicator predictive of an intermediate indicator and the target metric, and an intermediate indicator predictive of the target metric 415

Generate a graph including the target metric, the source indicator, and the intermediate indicator 420

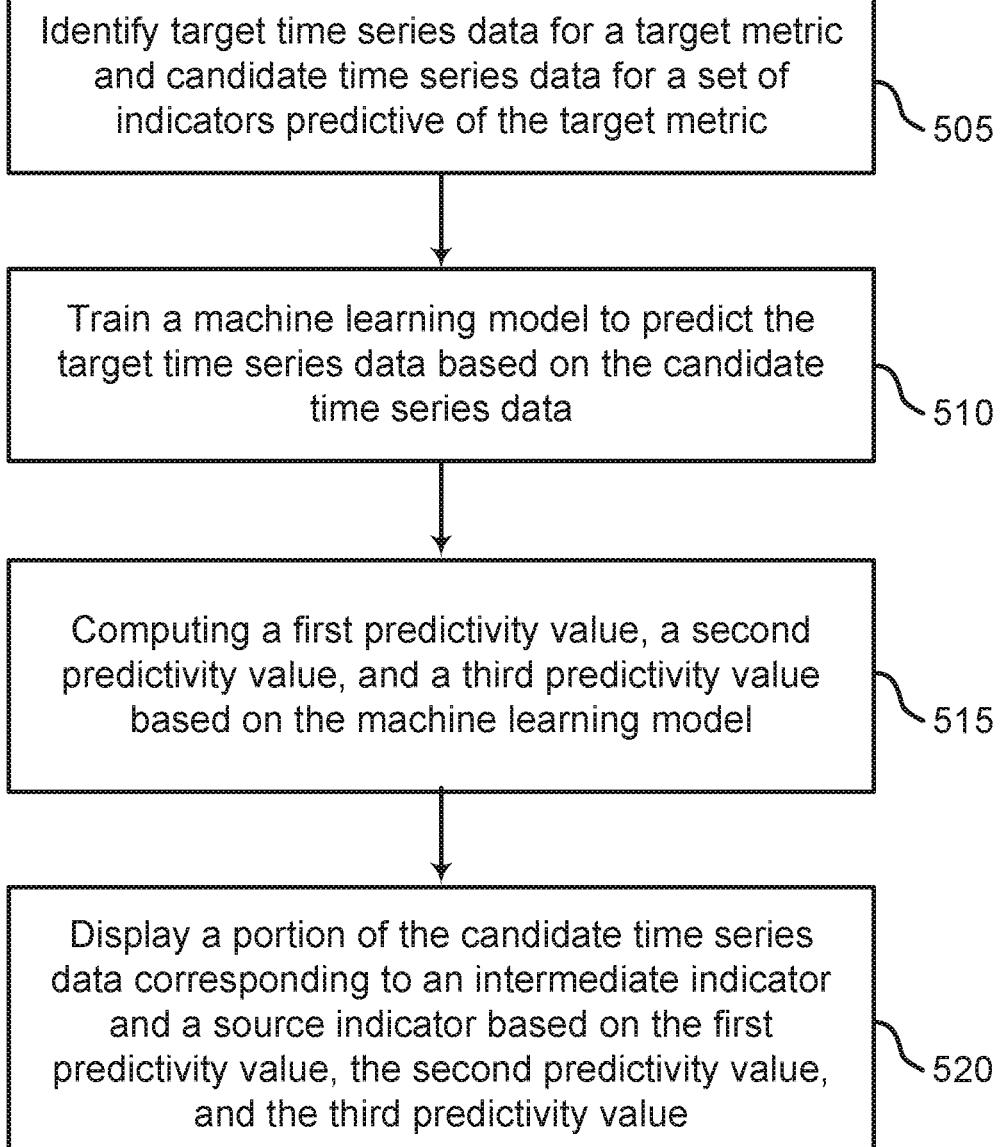

Identify target time series data for a target metric and candidate time series data for a set of indicators predictive of the target metric — 505

Train a machine learning model to predict the target time series data based on the candidate time series data — 510

Computing a first predictivity value, a second predictivity value, and a third predictivity value based on the machine learning model — 515

Display a portion of the candidate time series data corresponding to an intermediate indicator and a source indicator based on the first predictivity value, the second predictivity value, and the third predictivity value — 520

FIG. 5

SYSTEMS AND METHODS FOR INDICATOR IDENTIFICATION

BACKGROUND

The following relates generally to data analysis, and more specifically to identifying interrelated groups of data. Data analysis, or analytics, is the process of inspecting, cleaning, transforming and modeling data. In some cases, data analytics systems may include components for discovering useful information, collecting information, forming conclusions and supporting decision-making. Data analysis can be used to make decisions in a business, government, science or personal context. Data analysis includes a number of subfields including data mining and business intelligence. In a statistical context, data analysis includes descriptive statistics, exploratory data analysis (EDA), and confirmatory data analysis (CDA).

Identifying indicators is a subfield of data analysis. For example, a knowledge of data (indicators) that correlate with a future end goal are often used to assist decision-making and forecasting, because the indicators can suggest actions that can be taken or emphasized preemptively to maximize the end goal. Conventional indicator identification systems do not address a relation among numerous indicators and lead times with which different indicators are expected to impact other indicators and which in turn impact a goal. There is therefore a need in the art for an indicator identification system that can effectively identify a group of related indicators.

SUMMARY

Embodiments of the present disclosure provide a data processing system that uses a machine learning model to identify a closed group of indicators for a target metric, where the closed group comprises a source indicator and an intermediate indicator. According to some aspects, the intermediate indicator is predictive of the target metric, and the source indicator is predictive of both the intermediate indicator and the target metric. By identifying the closed group, the data processing system is able to effectively monitor progress towards the target metric over a longer period of time than conventional target metric identification systems can provide, thereby providing a finer-grained insight into an organization's data and outcomes over an intervening time period.

A method, apparatus, non-transitory computer readable medium, and system for indicator identification are described. One or more aspects of the method, apparatus, non-transitory computer readable medium, and system include identifying target time series data for a target metric and candidate time series data for a plurality of indicators predictive of the target metric; training a machine learning model to predict the target time series data based on the target time series data and the candidate time series data; computing a first predictivity value, a second predictivity value, and a third predictivity value based on the machine learning model, wherein the first predictivity value indicates that a source indicator from the plurality of indicators is predictive of the target metric, wherein the second predictivity value indicates that an intermediate indicator from the plurality of indicators is predictive of the target metric, and wherein the third predictivity value indicates that the source indicator is predictive of the intermediate indicator; and displaying a portion of the candidate time series data corresponding to the intermediate indicator and the source indicator based on the first predictivity value, the second predictivity value, and the third predictivity value.

A method, apparatus, non-transitory computer readable medium, and system for indicator identification are described. One or more aspects of the method, apparatus, non-transitory computer readable medium, and system include identifying target time series data for a target metric and candidate time series data for a plurality of indicators predictive of the target metric; training a machine learning model to predict the target time series data based on the target time series data and the candidate time series data; identifying a first time horizon for a source indicator from the plurality of indicators, wherein the source indicator is predictive of the target metric at the first time horizon; identifying a second time horizon for an intermediate indicator from the plurality of indicators, wherein the intermediate indicator is predictive of the target metric at the second time horizon; identifying a third time horizon for the source indicator, wherein the source indicator is predictive of the intermediate indicator at the third time horizon; and generating a graph including the target metric and the plurality of indicators based on the first time horizon, the second time horizon, and the third time horizon, wherein the graph includes a first edge between the source indicator and the target metric, a second edge between the intermediate indicator and the target metric, and a third edge between the source indicator and the intermediate indicator.

An apparatus, system, and method for indicator identification are described. One or more aspects of the apparatus, system, and method include a processor; a memory storing instructions executable by the processor; a data component configured to identify target time series data for a target metric and candidate time series data for a plurality of indicators predictive of the target metric; a training component configured to train a machine learning model to predict the target time series data based on the target time series data and the candidate time series data; a prediction component configured to compute a first predictivity value for an intermediate indicator from the plurality of indicators based on the machine learning model, wherein the first predictivity value indicates that the intermediate indicator is predictive of the target metric learning model, and to compute a second predictivity value and a third predictivity value for a source indicator from the plurality of indicators based on the machine learning model, wherein the second predictivity value indicates that the source indicator is predictive of the target metric and the third predictivity value indicates that the source indicator is predictive of the intermediate indicator; and a user interface configured to display a portion of the candidate time series data corresponding to the intermediate indicator and the source indicator based on the first predictivity value, the second predictivity value, and the third predictivity value.

BRIEF DESCRIPTION OF THE DRAWINGS

FIG. 4 shows an example of a method for providing a predictive graph according to aspects of the present disclosure.

FIG. 5 shows an example of a method for evaluating indicators for a target metric according to aspects of the present disclosure.

DETAILED DESCRIPTION

Figure 1:
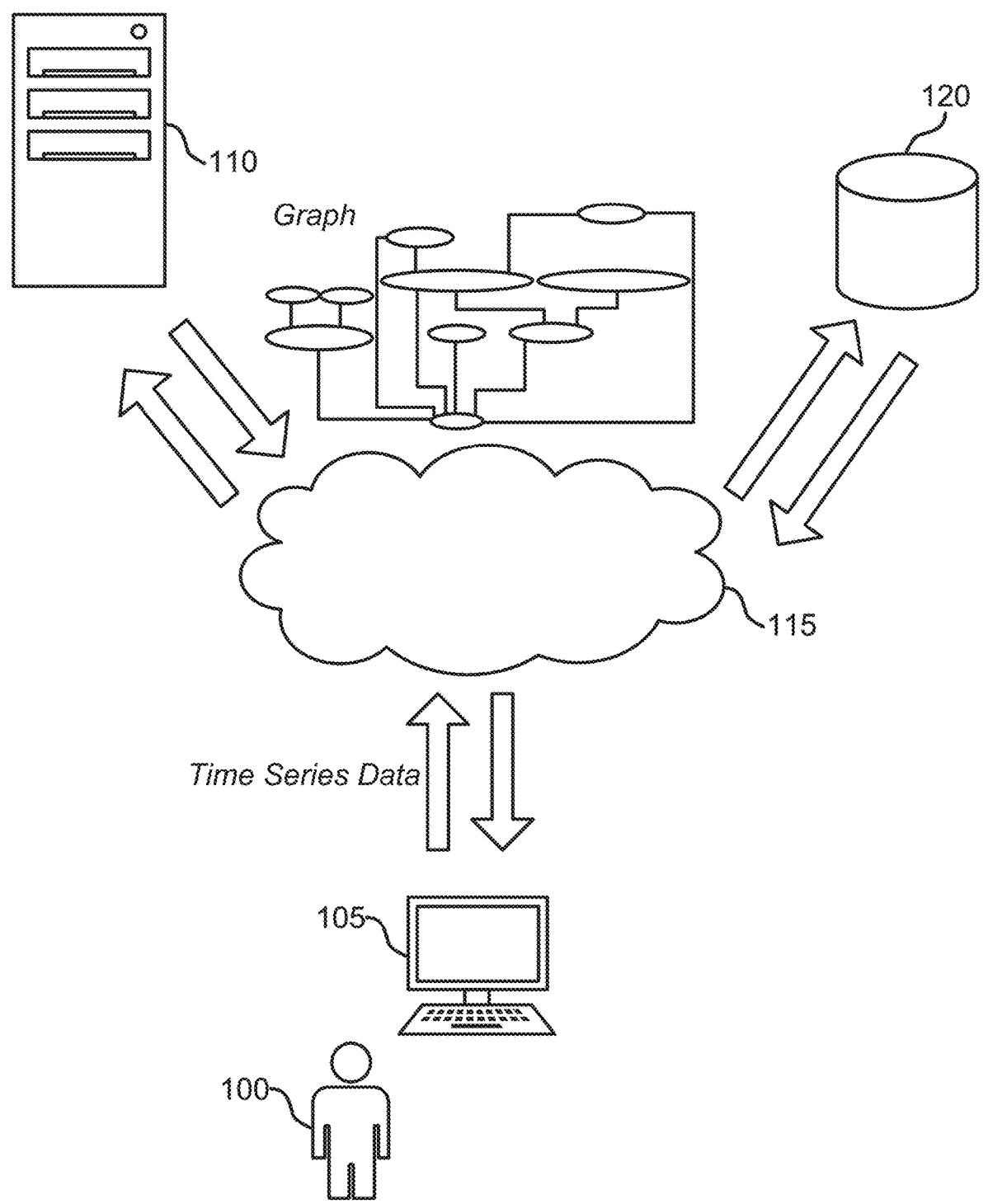
FIG. 1 shows an example of a data processing system according to aspects of the present disclosure.

Embodiments of the present disclosure relate to identifying indicators, a subfield of data analysis. For example, a knowledge of data (indicators) that correlate with a future end goal are often used to assist decision-making and forecasting, because the indicators can suggest actions that can be taken or emphasized to maximize the end goal. Therefore, identifying indicators that are predictive of an end goal is a key component of developing an effective business strategy.

Conventional indicator identification systems do not address how to select key indicators to track a relation among numerous indicators and lead times with which different indicators are expected to impact a goal. Therefore, embodiments of the present disclosure provide a data processing system that uses a machine learning model to identify a closed group of indicators for a target metric, where the closed group comprises a source indicator and an intermediate indicator. According to some aspects, the intermediate indicator is predictive of the target metric, and the source indicator is predictive of both the intermediate indicator and the target metric. By identifying the closed group, the data processing system is able to effectively monitor progress towards the target metric over a longer period of time than conventional target metric identification systems can provide, thereby providing a finer-grained insight into an organization's data and outcomes over an intervening time period. For example, the organization can be a government managing macroeconomics policy, a corporation managing its business, or other entities.

According to some aspects, a data processing system includes a data component, a training component, a prediction component, and a user interface. According to some aspects, the data component is configured to identify target time series data for a target metric and candidate time series data for a plurality of indicators predictive of the target metric. According to some aspects, the training component is configured to train a machine learning model to predict the target time series data based on the candidate time series data.

According to some aspects, the prediction component is configured to compute a first predictivity value, a second predictivity value, and a third predictivity value based on the machine learning model. In some cases, the first predictivity value indicates that a source indicator from the plurality of indicators is predictive of the target metric. In some cases, the second predictivity value indicates that an intermediate indicator from the plurality of indicators is predictive of the target metric. In some cases, the third predictivity value indicates that the source indicator is predictive of the intermediate indicator.

According to some aspects, the user interface is configured to display a portion of the candidate time series data corresponding to the intermediate indicator and the source indicator based on the first predictivity value, the second predictivity value, and the third predictivity value.

By computing the first predictivity value, the second predictivity value, and the third predictivity value, and displaying the portion of the candidate time series data based on the first predictivity value, the second predictivity value, and the third predictivity value, the data processing apparatus is able to provide a user with a visualization of an interrelated group of key performance indicators. The data processing apparatus is therefore able to perform the technical solution of reducing a large dataset into user-relevant data and displaying the reduced set of data to the user, thereby improving the operation of a computing system in the data analysis technological field.

According to some aspects, the data component is further configured to collect additional time series data for the intermediate indicator and the source indicator based on the first predictivity value, the second predictivity value, and the third predictivity value. According to some aspects, the prediction component is further configured to generate a prediction for the target metric based on the additional time series data.

By obtaining the additional time series data for the intermediate indicator and the source indicator based on the first predictivity value, the second predictivity value, and the third predictivity value, the data processing system is able to bolster monitoring and tracking of data that is predictive of the target metric, thereby providing a user greater and multi-faceted insight into actions that can be taken to achieve the target metric. In some cases, the data includes outcomes and actions to adapt strategies, policies and tactics. The prediction component is then able to make a more refined prediction in response to the additional time series data. The data processing system thereby provides an improvement in prior data processing technology, resulting in improved indicator identification.

As used herein, "target time series data" refers to time series data for a target metric. For example, the time series data can include a quantity of a target metric (such as an amount of revenue, an amount of products delivered, etc.) ordered according to discrete time periods (such as days). As used herein, a "target metric" refers to data that is descriptive of a target goal.

As used herein, "candidate time series data" refers to a set of candidate time series for a set of indicators. For example, each of the candidate time series can include a quantity of an indicator metric (such as webpage visits, shopping cart events, etc.) ordered according to discrete time periods (such as days). An "indicator" refers to a metric that is potentially predictive of the target metric or another indicator. In some embodiments, the target time series data can be included (for example, as a column) in the candidate time series data.

As used herein, a "predictivity value" refers to a quantification of a degree to which an indicator is predictive of a target metric or another indicator. According to some aspects, the predictivity value corresponds to a weight for an indicator that is determined by the machine learning model.

According to some aspects, the present disclosure provides a data-driven method to identify leading source and intermediate indicators from a very large set of metrics. In some embodiments, the data-driven method replaces human-curated methods of determining indicators. According to some aspects, the data-driven method is input-data lightweight, as it uses metric-level time series data rather than visit (session)-level data or more granular data.

According to some aspects, a closed sub-graph of a source indicator, an intermediate indicator, and a target metric is identified and scored relative to other indicators and sub-graphs. In some embodiments, the scoring provides for a comparison of the importance of the closed sub-graph to help a user select a source indicator and a leading indicator to focus on.

According to some aspects, the present disclosure provides a data-driven method to recommend a time horizon (e.g., a look-ahead window) for different indicators. In an example, a target metric is an amount of revenue from all products. As the revenue can be temporally impacted by time-to-purchase metrics, it is heterogeneous across purchasers and heterogeneous within purchasers across products. If other metrics are used to predict the amount of revenue such that key indicators are identified, an accuracy (e.g., error) of a prediction for the amount of revenue can be non-monotonic with respect to a time horizon, as opposed to monotonic (i.e., decreasing or increasing as the duration of the time horizon increases or decreases).

In the monotonic setting, a human choice of a time horizon is guided by a tolerance for a degree of error and operational constraints of any action that can be taken. However, according to some embodiments, when the error is non-monotonic, the selection of the time horizon is instead guided by identifying a time period in which the error is lowest, such that a better gauge of the target metric is obtained, thereby providing a time horizon that is efficiently and accurately learned from data instead of being hand-curated. According to some aspects, a predictivity of the set of indicators are not assumed to be stationary and can change with new data; e.g., holiday period may yield different relations than an off-season period.

An embodiment of the present disclosure is used in a data analysis context. For example, a user provides time series data to the system. The time series data describes a set of metrics over a period of days. The user is interested in determining metrics that are predictive of a target metric of a number of product orders that the user will receive in five days.

The data processing system uses the time series data to train a machine learning model to predict target time series data for the target metric. Based on the prediction, the data processing system determines how predictive the metrics in the set of metrics are for the target metric. The data processing system also determines a predictive relationship between metrics of the set of metrics. In an example, the system determines that a number of unique visitors is predictive of a number of orders in five days, that a number of products added to a cart is predictive of the number of orders in two days, and that the number of unique visitors is predictive of the number of products added to the cart in three days.

Accordingly, in an example, the data processing system determines that the number of unique visitors is a source indicator and the number of products added to the cart is an intermediate indicator. In some embodiments, the data processing system provides a graph including the metrics of the set of metrics connected by edges corresponding to time periods, including a closed sub-graph comprising the source indicator, the intermediate indicator, and the target metric. The graph helps the user to understand the interrelationship between the metrics of the set of metrics, and to identify source indicators and intermediate indicators that can be monitored so that the user will have a better understanding of how many product orders the user will receive in five days.

Furthermore, in some cases, the data processing system identifies a set of closed sub-graphs including source indicators and intermediate indicators for a target metric, and ranks the predictivity of the respective closed sub-graphs according to an error computation. This assists the user in choosing which source indicators and intermediate indicators the user should focus on.

Example applications of the present disclosure in the data analysis context are provided with reference to FIGS. 1 and 4. Details regarding the architecture of the data processing system are provided with reference to FIGS. 1-3. Examples of a process for data processing are provided with reference to FIGS. 4-6.

Data Processing System

A system and an apparatus for indicator identification is described with reference to FIGS. 1-3. One or more aspects of the system and the apparatus include a processor, a memory storing instructions executable by the processor; a data component configured to identify target time series data for a target metric and candidate time series data for a plurality of indicators predictive of the target metric; a training component configured to train a machine learning model to predict the target time series data based on the target time series data and the candidate time series data; a prediction component configured to compute a first predictivity value, a second predictivity value, and a third predictivity value based on the machine learning model, wherein the first predictivity value indicates that a source indicator from the plurality of indicators is predictive of the target metric, wherein the second predictivity value indicates that an intermediate indicator from the plurality of indicators is predictive of the target metric, and wherein the third predictivity value indicates that the source indicator is predictive of the intermediate indicator; and a user interface configured to display a portion of the candidate time series data corresponding to the intermediate indicator and the source indicator based on the first predictivity value, the second predictivity value, and the third predictivity value.

According to some aspects, the data component is further configured to obtain additional time series data for the intermediate indicator and the source indicator based on the first predictivity value, the second predictivity value, and the third predictivity value.

Some examples of the system and the apparatus further include a graph component configured to generate a graph including the target metric and the plurality of indicators based on the first predictivity value, the second predictivity value, and the third predictivity value, where the graph includes a first edge between the intermediate indicator and the target metric, a second edge between the source indicator and the intermediate indicator, and a third edge between the source indicator and the target metric.

FIG. 1 shows an example of data processing system according to aspects of the present disclosure. The example shown includes user 100, user device 105, data processing apparatus 110, cloud 115, and database 120.

Referring to FIG. 1, user 100 provides time series data for a set of indicators to data processing apparatus 110 via a user interface provided by data processing apparatus 110 on user device 105. Data processing apparatus 110 trains a machine learning model to predict target time series data based on the time series data, and determines predictivity values for a source indicator of the set of indicators and an intermediate indicator of the set of indicators based on the machine learning model.

According to some aspects, the source indicator is predictive of a target metric and of the intermediate indicator, and the intermediate indicator is predictive of the target metric. In some embodiments, data processing apparatus 110 generates a graph including the set of indicators, the target metric, and a closed sub-graph including the source indicator and the intermediate indicator, where the source indicator is connected to the intermediate indicator and the target metric by edges, and the intermediate indicator is connected to the target metric by an edge. In some embodiments, data processing apparatus 110 provides the graph to user 100 via the user interface displayed on user device 105.

According to some aspects, user device 105 is a personal computer, laptop computer, mainframe computer, palmtop computer, personal assistant, mobile device, or any other suitable processing apparatus. In some examples, user device 105 includes software that allows user 100 to interact with data processing apparatus 110 and to receive data (including a graph) from data processing apparatus 110.

According to some aspects, a user interface enables user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, the user interface may be a graphical user interface (GUI).

According to some aspects, data processing apparatus 110 includes a computer implemented network. In some embodiments, the computer implemented network includes one or more artificial neural networks. In some embodiments, data processing apparatus 110 also includes one or more processors, a memory subsystem, a communication interface, an I/O interface, one or more user interface components, and a bus. In some embodiments, data processing apparatus 110 communicates with user device 105 and database 120 via cloud 115.

In some cases, data processing apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP) and simple mail transfer protocol (SMTP), although other protocols such as file transfer protocol (FTP) and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Data processing apparatus 110 is an example of, or includes aspects of, the corresponding element described with reference to FIG. 2. Further detail regarding the architecture of data processing apparatus 110 is provided with reference to FIGS. 2-3. Further detail regarding a process for data processing is provided with reference to FIGS. 4-6.

According to some aspects, cloud 115 is a computer network configured to provide on-demand availability of computer system resources, such as data storage and computing power. In some examples, cloud 115 provides resources without active management by a user. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers.

In another example, cloud 115 is based on a local collection of switches in a single physical location. According to some aspects, cloud 115 provides communications between user device 105, data processing apparatus 110, and database 120.

According to some aspects, database 120 is an organized collection of data. In some embodiments, database 120 stores data in a specified format known as a schema. According to some aspects, database 120 is structured as a single database, a distributed database, multiple distributed databases, an emergency backup database, or a combination thereof. In some cases, a database controller manages data storage and processing in database 120. In some cases, a user interacts with the database controller. In other cases, the database controller operates automatically without user interaction. In some aspects, database 120 is external to data processing apparatus 110 and communicates with data processing apparatus 110 via cloud 115. In some embodiments, database 120 is included in data processing apparatus 110.

Figure 2:
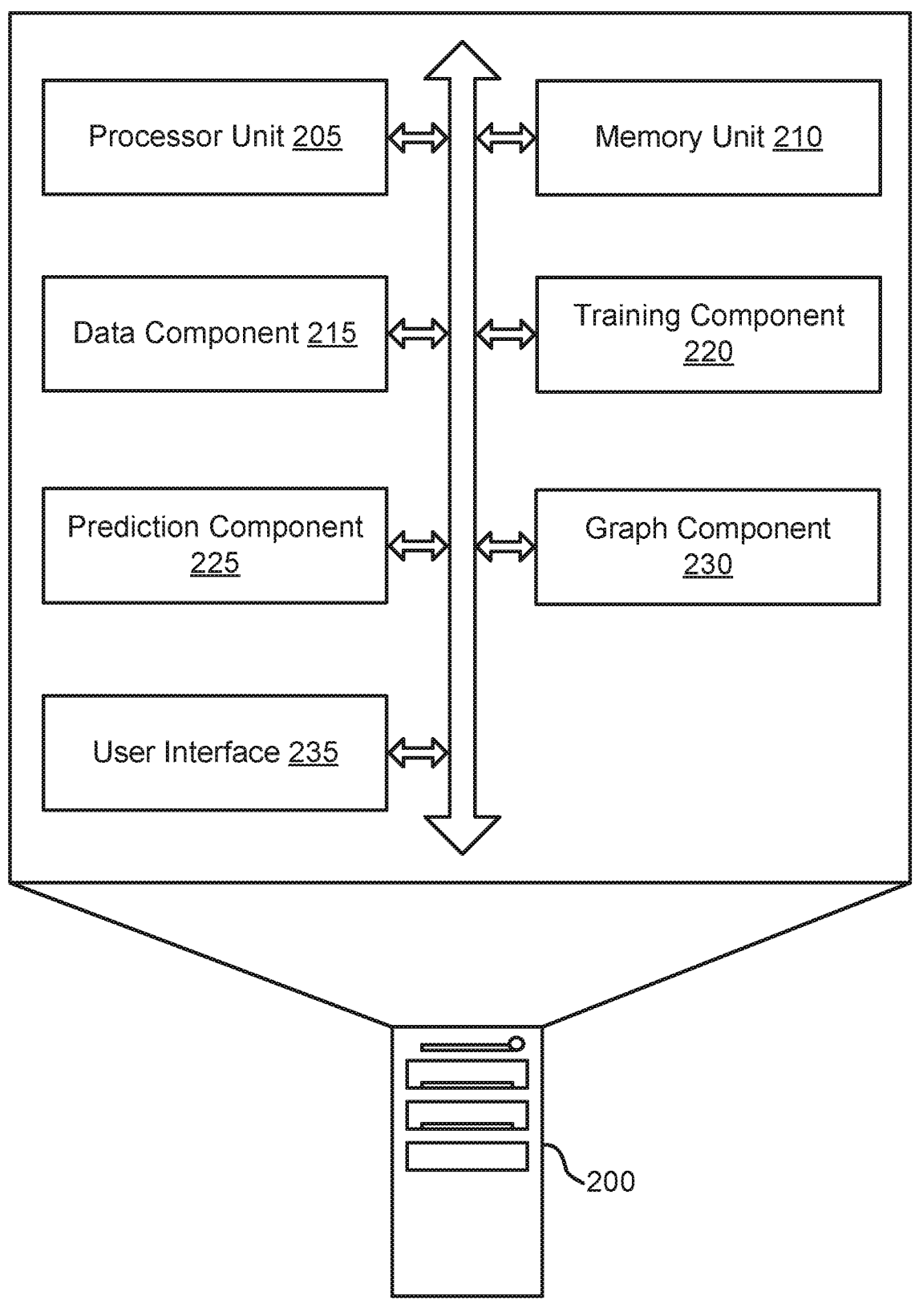
FIG. 2 shows an example of a data processing apparatus according to aspects of the present disclosure.

FIG. 2 shows an example of data processing apparatus 200 according to aspects of the present disclosure. Data processing apparatus 200 is an example of, or includes aspects of, the corresponding element described with reference to FIG. 1. In one aspect, data processing apparatus 200 includes processor unit 205, memory unit 210, data component 215, training component 220, prediction component 225, graph component 230, and user interface 235.

According to some aspects, processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

According to some aspects, memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, data component 215 is configured to identify target time series data for a target metric and candidate time series data for a plurality of indicators predictive of the target metric. In some aspects, data component 215 is further configured to obtain additional time series data for the intermediate indicator and the source indicator based on the first predictivity value, the second predictivity value, and the third predictivity value.

According to some aspects, data component 215 is implemented as one or more hardware circuits, as firmware, as software stored in memory of memory unit 210 and executed by a processor of processor unit 205, or as a combination thereof.

According to some aspects, training component 220 is configured to train a machine learning model to predict the target time series data based on the candidate time series data and/or the target time series data. According to some aspects, training component 220 is implemented as one or more hardware circuits, as firmware, as software stored in memory of memory unit 210 and executed by a processor of processor unit 205, or as a combination thereof.

According to some aspects, prediction component 225 is configured to compute a first predictivity value, a second predictivity value, and a third predictivity value based on the machine learning model, where the first predictivity value indicates that a source indicator from the plurality of indicators is predictive of the target metric, where the second predictivity value indicates that an intermediate indicator from the plurality of indicators is predictive of the target metric, and where the third predictivity value indicates that the source indicator is predictive of the intermediate indicator. In some examples, prediction component 225 is configured to generate a prediction for the target metric based on the additional time series data.

In some examples, prediction component 225 is configured to identify a first time horizon, where the source indicator is predictive of the target metric at the first time horizon. In some examples, prediction component 225 is configured to identify a second time horizon that is less than the first time horizon, where the intermediate indicator is predictive of the target metric at the second time horizon. In some examples, prediction component 225 is configured to identify a third time horizon based on the first time horizon and the second time horizon, where the source indicator is predictive of the intermediate indicator at the third time horizon.

In some aspects, the third time horizon is equal to a difference between the first time horizon and the second time horizon. In some aspects, the first time horizon, the second time horizon, and the third time horizon are identified based on the machine learning model. In some examples, prediction component 225 is configured to identify prediction error values for each of a set of time horizons, where the first time horizon, the second time horizon, and the third time horizon are identified based on the prediction error values. In some examples, prediction component 225 is configured to receive time horizon input from a user, where the first time horizon, the second time horizon, and the third time horizon are identified based on the time horizon input.

In some examples, prediction component 225 is configured to generate predictivity values for the set of indicators, respectively, based on the machine learning model. In some examples, prediction component 225 is configured to rank the set of indicators based on the predictivity values. In some examples, prediction component 225 is configured to identify a set of indicator pairs, where each of the set of indicator pairs includes a first element and a second element. In some examples, prediction component 225 is configured to rank the set of indicator pairs, where the source indicator and the intermediate indicator are identified based on the ranking.

In some examples, prediction component 225 is configured to identify prediction error values for each of a set of time horizons, where the first time horizon, the second time horizon, and the third time horizon are identified based on the prediction error values. According to some aspects, prediction component 225 is implemented as one or more hardware circuits, as firmware, as software stored in memory of memory unit 210 and executed by a processor of processor unit 205, or as a combination thereof.

According to some aspects, prediction component 225 comprises the machine learning model. According to some aspects, the machine learning model is comprised in a separate apparatus from data processing apparatus 200. According to some aspects, the machine learning model comprises a plurality of machine learning models. According to some aspects, the machine learning model comprises one or more artificial neural networks (ANNs).

An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, the machine learning model comprises a regression ANN. In some embodiments, the machine learning model includes a temporal attention head in a first layer and a candidate attention head in a second layer. In some examples, the first layer includes a set of parallel long short-term memory (LSTM) networks corresponding to the set of indicators. Long short-term memory (LSTM) networks are a type of recurrent neural network (RNN) capable of learning order dependence in sequence prediction tasks. LSTM networks can be used for classifying, processing and making predictions based on time series data.

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

According to some aspects, the machine learning model is implemented as one or more hardware circuits, as firmware, as software stored in memory of memory unit 210 and executed by a processor of processor unit 205, or as a combination thereof. The machine learning model is an example of, or includes aspects of, the machine learning model described with reference to FIG. 3.

According to some aspects, graph component 230 is configured to generate a graph including the target metric and the set of indicators based on the first predictivity value, the second predictivity value, and the third predictivity value, where the graph includes a first edge between the source indicator and the target metric, a second edge between the intermediate indicator and the target metric, and a third edge between the source indicator and the intermediate indicator.

According to some aspects, graph component 230 is configured to generate a graph including the target metric and the set of indicators based on the first time horizon, the second time horizon, and the third time horizon, where the graph includes a first edge between the source indicator and the target metric, a second edge between the intermediate indicator and the target metric, and a third edge between the source indicator and the intermediate indicator.

According to some aspects, graph component 230 is implemented as one or more hardware circuits, as firmware, as software stored in memory of memory unit 210 and executed by a processor of processor unit 205, or as a combination thereof.

According to some aspects, user interface 235 is configured to display a portion of the candidate time series data corresponding to the intermediate indicator and the source indicator based on the first predictivity value, the second predictivity value, and the third predictivity value. According to some aspects, data processing apparatus 200 is configured to provide user interface 235 on a user device (such as the user device described with reference to FIG. 1). According to some aspects, user interface 235 is configured to interface with a display (such as a display of data processing apparatus 200, or a display of the user device). According to some aspects, user interface 235 is implemented as software stored in memory of memory unit 210 and executed by a processor of processor unit 205.

Figure 3:
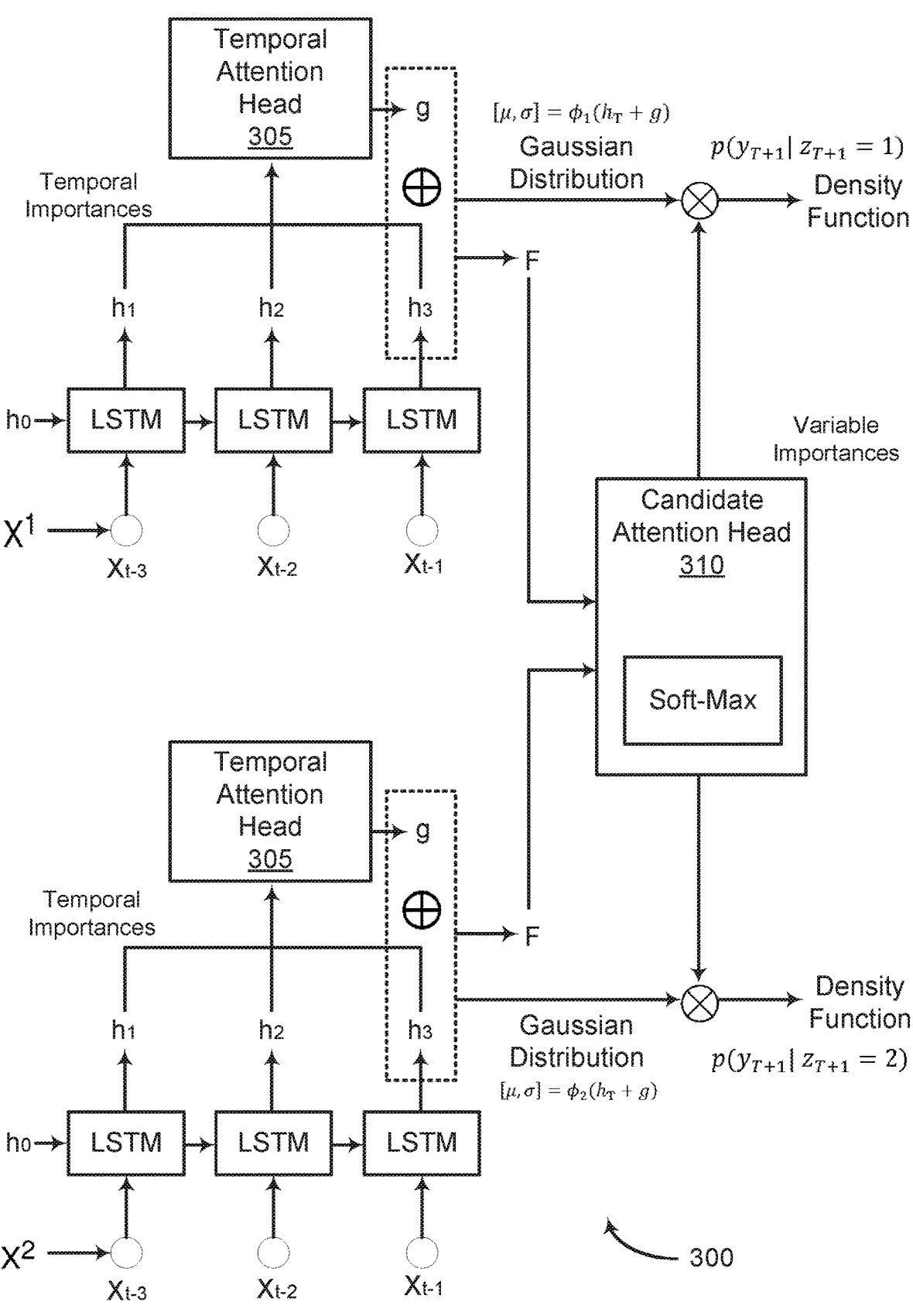
FIG. 3 shows an example of machine learning model according to aspects of the present disclosure.

FIG. 3 shows an example of machine learning model 300 according to aspects of the present disclosure. In one aspect, machine learning model 300 includes temporal attention head 305 and candidate attention head 310. In some embodiments, the machine learning model includes an interpretable multi-variable model comprising one or more LSTMs. Machine learning model 300 is an example of, or includes aspects of, the machine learning model described with reference to FIG. 2.

Referring to FIG. 3, according to an embodiment, a two-stage machine learning model is applied on the candidate time series data, where a first layer includes parallel LSTMs for each candidate time series of the candidate time series data. In some embodiments, each LSTM respectively outputs a hidden state sequence output for a candidate time series corresponding to an indicator of the set of indicators. In some embodiments, attention is applied independently to a hidden sequence for each candidate time series.

In some embodiments, attention weights correspond to a temporal importance of timesteps for each candidate time series. A summarized contextual history for each candidate time series is generated through a concatenation of a last hidden state vector in the hidden state sequence and temporal attention weights for the candidate time series. A second layer of the machine learning model includes attention applied to the final contextual history vectors from each candidate time series using a latent variable.

In an example, $X^1$ is a first candidate time series of the candidate time series data corresponding to a first indicator. Multiple timesteps for the first candidate time series including $$X_{t-3}^1, X_{t-2}^1, \text{ and } X_{t-1}^1$$

are input to an LSTM model of machine learning model 300 to output hidden state sequence $h_1$, $h_2$, and $h_3$, respectively, where t is a number of discrete time periods in the candidate time series data (such as days). Then, the hidden state sequence $h_1$, $h_2$, and $h_3$ are input to temporal attention head 305 to produce temporal attention weights g corresponding to temporal importance of the timesteps for the first candidate time series $X^1$. The temporal attention weights g are concatenated with the last hidden state vector $h_3$ to produce a vector, F.

In the example, $X^2$ is a second candidate time series of the candidate time series data corresponding to a second indicator that is different from the first indicator. The multiple timesteps for the second candidate time series may also include data corresponding to time periods $$X_{t-3}^2, X_{t-2}^2, \text{ and } X_{t-1}^2. X_{t-3}^2, \text{ and } X_{t-1}^2$$

are input to an LSTM model of machine learning model 300 to produce hidden state sequence $h_1$, $h_2$, and $h_3$, respectively. Then, the hidden state sequence $h_1$, $h_2$, and $h_3$ are input to temporal attention head 305 to produce temporal attention weights g corresponding to a temporal importance of the timesteps for the second candidate time series $X^2$. The temporal attention weights g are concatenated with last hidden state vector $h_3$ to produce the corresponding vector F.

FIG. 3 is an example illustration of a two-stage machine learning model (including temporal attention and variable attention). Embodiments of the present disclosure are not limited to two candidate time series. In some examples, there are three or more candidate time series involving data corresponding to three or more indicators.

According to an embodiment, both vectors F related to the first and second candidate time series are input to candidate attention head 310. In some embodiments, candidate attention head 310 includes a softmax function. In some embodiments, the softmax function is used as an activation function of machine learning model 300 to normalize the output of machine learning model 300 to a probability distribution over predicted output classes. In some embodiments, after applying the softmax function, each component of a feature map output of machine learning model 300 is within the interval (0, 1), and the components add up to one. In some embodiments, the values of the components are interpreted as probabilities.

According to an embodiment, machine learning model 300 calculates a density function using a Gaussian distribution parametrized by $$[\mu_n, \sigma_n] = \phi_n(h_T^N \oplus g^N):$$

$$p(y_{T+1} \mid z_{T+1} = n, h_T^n \oplus g^n) \qquad (1)$$

In some examples, $\phi_n(\bullet)$ is an arbitrary function or a feed forward ANN (e.g., a single layer neural network). In some embodiments, the Gaussian distribution parameters are not shared across candidate time series.

Accordingly, $$Pr(z_{T+1} = n \mid h_T^1 \oplus g^1, \ldots, h_T^N \oplus g^N)$$

is calculated by taking a softmax over $$\{F(h_T^n \oplus g^n)\}_N,$$

where F(•) is a feed forward ANN. Parameters of F are shared across a set of candidate time series data. In some embodiments, a mixture attention equation is formulated as follows:

$$p(y_{T+1} \mid X_T) = \sum_{n=1}^{N} p(y_{T+1} \mid z_{T+1} = n, X_T) \cdot Pr(z_{T+1} = n \mid X_T) = \qquad (2)$$

$$\sum_{n=1}^{N} p(y_{T+1} \mid z_{T+1} = n, h_1^n, \ldots, h_T^n) \cdot Pr(z_{T+1} = n \mid \tilde{h}_1, \ldots, \tilde{h}_T) = \sum_{n=1}^{N}$$

$$p\left(y_{T+1} \mid z_{T+1} = n, \underbrace{h_T^n \oplus g^n}_{Temporal\ attention}\right) \cdot \underbrace{Pr(z_{T+1} = n \mid h_T^1 \oplus g^1, \ldots, h_T^N \oplus g^N)}_{Variable\ attention}$$

In the example illustrated in FIG. 3, the density function associated with the first candidate time series is $p(y_{T+1} \mid z_{T+1}=1)$ and the density function associated with the second candidate time series is $p(y_{T+1} \mid z_{T+1}=2)$. In some examples, machine learning model 300 includes LSTM ANNs, and the machine learning model is configured to segment candidate time series data based on a rolling window.

In an example, a period of 365 days (e.g., t=365) can be segmented to a set of rolling windows of ten days. In some embodiments, the size of the rolling window is user-tunable. Furthermore, a time horizon d following the rolling window can be provided by a user or can be determined by the data processing system as described with reference to FIG. 5. In the example, then, d=1 day. In the example, then, the machine learning model 300 takes a first day to a tenth day of a set of candidate time series as input to predict an eleventh day of the target time series data for a target metric. Machine learning model 300 then takes the second day to the eleventh day of the candidate time series as input to predict the twelfth day of the target time series data for the target metric. Machine learning model 300 can repeat this process until a prediction for each time horizon following an available rolling window is made.

In some embodiments, each of the rolling windows is assigned a weight learned during a training process of machine learning model 300 described with reference to FIG. 5. In an embodiment, machine learning model 300 includes a two-level hierarchy network applied to each candidate time series, where a first layer (i.e., a first level) applies temporal attention on each day (i.e., to predict a lead time) and a second layer (i.e., a second level) applies indicator attention on each candidate time series to predict target time series data (i.e., to determine leading indicators).

According to some aspects, a set of M candidate time series for time periods prior to t (e.g., a row of the candidate time series data) are used to predict the target time series data for the target metric and the M candidate time series for a source indicator or an intermediate indicator in time period t. According to some aspects, a time horizon d determines past time periods used for the prediction (e.g., time periods up to and including t-d are used).

According to some aspects, at every step, the training component computes a loss function. According to some aspects, for each prediction, a symmetric mean absolute percentage error (sMAPE) performance metric is computed and used. For example, according to some aspects, given a value of a time horizon d (such as a number of days), machine learning model 300 predicts each of the target time series data and the M candidate time series for the set of indicators at time t. In some cases, the loss is the sum of the M+1 losses, and each loss corresponds to each of the predictions. According to some aspects, for different values of the time horizon d, a separate machine learning model is trained.

Machine learning model 300 is an example of or includes aspects of the data processing network described with reference to FIG. 4 of U.S. patent application Ser. No. 17/329, 934, which is hereby incorporated by reference in its entirety.

Data Processing

A method for indicator identification is described with reference to FIGS. 4-6. One or more aspects of the method include identifying target time series data for a target metric and candidate time series data for a plurality of indicators predictive of the target metric; training a machine learning model to predict the target time series data based on the target time series data and the candidate time series data; computing, by a prediction component, a first predictivity value, a second predictivity value, and a third predictivity value based on the machine learning model, wherein the first predictivity value indicates that a source indicator from the plurality of indicators is predictive of the target metric, wherein the second predictivity value indicates that an intermediate indicator from the plurality of indicators is predictive of the target metric, and wherein the third predictivity value indicates that the source indicator is predictive of the intermediate indicator; and displaying a portion of the candidate time series data corresponding to the intermediate indicator and the source indicator based on the first predictivity value, the second predictivity value, and the third predictivity value.

Some examples of the method further include generating a graph including the target metric and the plurality of indicators based on the first predictivity value, the second predictivity value, and the third predictivity value, wherein the graph includes a first edge between the source indicator and the target metric, a second edge between the intermediate indicator and the target metric, and a third edge between the source indicator and the intermediate indicator.

Some examples of the method further include collecting additional time series data for the intermediate indicator and the source indicator based on the first predictivity value, the second predictivity value, and the third predictivity value. Some examples further include generating a prediction for the target metric based on the additional time series data.

Some examples of the method further include identifying a first time horizon, wherein the source indicator is predictive of the target metric at the first time horizon. Some examples further include identifying a second time horizon that is less than the first time horizon, wherein the intermediate indicator is predictive of the target metric at the second time horizon. Some examples further include identifying a third time horizon based on the first time horizon and the second time horizon, wherein the source indicator is predictive of the intermediate indicator at the third time horizon. In some aspects, the third time horizon is equal to a difference between the first time horizon and the second time horizon.

In some aspects, the first time horizon, the second time horizon, and the third time horizon are identified based on the machine learning model. Some examples of the method include identifying prediction error values for each of a plurality of time horizons, wherein the first time horizon, the second time horizon, and the third time horizon are identified based on the prediction error values. Some examples of the method further include receiving time horizon input from a user, wherein the first time horizon, the second time horizon, and the third time horizon are identified based on the time horizon input.

Some examples of the method further include generating predictivity values for the plurality of indicators, respectively, based on the machine learning model. Some examples further include ranking the plurality of indicators based on the predictivity values. Some examples of the method further include identifying a plurality of indicator pairs, wherein each of the plurality of indicator pairs includes a first element and a second element. Some examples further include ranking the plurality of indicator pairs, wherein the source indicator and the intermediate indicator are identified based on the ranking.

A method for indicator identification is described with reference to FIGS. 4-6. One or more aspects of the method include identifying target time series data for a target metric and candidate time series data for a plurality of indicators predictive of the target metric; training a machine learning model to predict the target time series data based on the target time series data and the candidate time series data; identifying a first time horizon for a source indicator from the plurality of indicators, wherein the source indicator is predictive of the target metric at the first time horizon; identifying a second time horizon for an intermediate indicator from the plurality of indicators, wherein the intermediate indicator is predictive of the target metric at the second time horizon; identifying a third time horizon for the source indicator, wherein the source indicator is predictive of the intermediate indicator at the third time horizon; and generating a graph including the target metric and the plurality of indicators based on the first time horizon, the second time horizon, and the third time horizon, wherein the graph includes a first edge between the source indicator and the target metric, a second edge between the intermediate indicator and the target metric, and a third edge between the source indicator and the intermediate indicator.

In some aspects, the second time horizon is less than the first time horizon. In some aspects, the third time horizon is based on the first time horizon and the second time horizon. In some aspects, the third time horizon is equal to a difference between the first time horizon and the second time horizon.

In some aspects, the first time horizon, the second time horizon, and the third time horizon are identified based on the machine learning model. Some examples of the method further include identifying prediction error values for each of a plurality of time horizons, wherein the first time horizon, the second time horizon, and the third time horizon are identified based on the prediction error values. Some examples of the method further include receiving time horizon input from a user, wherein the first time horizon, the second time horizon, and the third time horizon are identified based on the time horizon input.

Some examples of the method further include generating predictivity values for the plurality of indicators, respectively, based on the machine learning model. Some examples further include ranking the plurality of indicators based on the predictivity values. Some examples of the method further include identifying a plurality of indicator pairs, wherein each of the plurality of indicator pairs includes a first element and a second element. Some examples further include ranking the plurality of indicator pairs, wherein the source indicator and the intermediate indicator are identified based on the ranking.

FIG. 4 shows an example of a method 400 for providing a predictive graph according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 4, in an example application of the present disclosure in a data analysis context, a user provides candidate time series data (such as tabular data including rows corresponding to successive days and columns corresponding to candidate time series for a set of indicators for a target metric) to the data processing apparatus. In another example, the candidate time series data can be automatically pulled from a dataset by the system. The data processing apparatus trains a machine learning model to predict time series data for the target metric with respect to the candidate time series data. The data processing apparatus then determines predictivity values for a source indicator and an intermediate indicator of the set of indicators based on the machine learning model.

According to some aspects, the source indicator is predictive of a target metric and of the intermediate indicator, and the intermediate indicator is predictive of the target metric. In some embodiments, the data processing apparatus generates a graph including the set of indicators, the target metric, and a closed sub-graph including the source indicator and the intermediate indicator, where the source indicator is connected to the intermediate indicator and the target metric by edges, and the intermediate indicator is connected to the target metric by an edge. In some embodiments, the data processing apparatus provides the graph to the user.

At operation 405, a user provides candidate time series data as described with reference to FIG. 1. For example, in some cases, the user provides the candidate time series data to the data processing apparatus via a user interface displayed by the data processing apparatus on a user device.

At operation 410, the system predicts target time series data for a target metric based on the candidate time series data. In some cases, the operations of this step refer to, or may be performed by, a data processing apparatus as described with reference to FIGS. 1 and 2. For example, in some cases, the data processing apparatus predicts the target time series data for the target metric as described with reference to FIG. 5.

At operation 415, based on the target time series data, the system identifies a source indicator predictive of an intermediate indicator and the target metric, and an intermediate indicator predictive of the target metric. In some cases, the operations of this step refer to, or may be performed by, a data processing apparatus as described with reference to FIGS. 1 and 2. For example, in some cases, the data processing apparatus identifies the source indicator and the intermediate indicator as described with reference to FIG. 5.

In some cases, the user provides a first time horizon, a second time horizon, and a third time horizon to the data processing apparatus, where the source indicator is predictive of the target metric at the first time horizon, the intermediate indicator is predictive of the target metric at the second time horizon, and the source indicator is predictive of the intermediate indicator at the third time horizon. In some cases, the data processing apparatus determines the first time horizon, the second time horizon, and the third time horizon based on the machine learning model as described with reference to FIG. 5.

At operation 420, the system generates a graph including the target metric, the source indicator, and the intermediate indicator. In some cases, the operations of this step refer to, or may be performed by, a data processing apparatus as described with reference to FIGS. 1 and 2. For example, in some cases, the data processing apparatus generates the graph as described with reference to FIG. 5. In some cases, the data processing apparatus displays the graph to the user via the user interface.

FIG. 5 shows an example of a method 500 for evaluating indicators for a target metric according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 5, according to some aspects, the data processing system trains a machine learning model to make predictions for input time series data with respect to a target metric and a set of indicators. In some embodiments, based on the machine learning model, the data processing system identifies a first predictivity value and a third predictivity value for a source indicator of the set of indicators and a second predictivity value for an intermediate indicator of the set of indicators. In some embodiments, the source indicator is predictive of the target metric and of the intermediate indicator, and the intermediate indicator is predictive of the target metric. In some embodiments, the first predictivity value, the second predictivity value, and the third predictivity value respectively represent a relative degree to which the source indicator is predictive of the intermediate indicator and the target metric, and the intermediate indicator is predictive of the target metric.

According to some aspects, the data processing apparatus obtains additional time series data for the source indicator and the intermediate indicator based on the first predictivity value, the second predictivity value, and the third predictivity value, thereby allowing the data processing system to perform further downstream data refinement to help a user better understand groups of leading indicators for a target metric.

At operation 505, the system identifies target time series data for a target metric and candidate time series data for a set of indicators predictive of the target metric. In some cases, the operations of this step refer to, or may be performed by, a data component as described with reference to FIG. 2.

According to some aspects, each row of the candidate time series data represents a successively increasing discrete time period (such as a day), and columns are candidate time series respectively corresponding to a set of indicators, such as webpage visits, webpage views, clicks, conversions, shopping cart events, etc. According to some aspects, the target time series data is a column of the candidate time series data relating to a target metric (e.g., a target outcome) included in the candidate time series data, such as an amount of revenue, a number of products sold, etc.

According to some aspects, the data component receives the target time series data and/or the candidate time series data from a user. According to some aspects, the data component retrieves the target time series data and/or the candidate time series data from a database (such as the database described with reference to FIG. 1). According to some aspects, the data component learns the target time series data from a user's frequent choice of target time series from past behaviors in a behavior log for the user. According to some aspects, the data component retrieves the candidate time series data from a dataset including the candidate time series data.

According to some aspects, the data component is configured to perform time series clustering on the candidate time series data and to select a representative time series from each cluster. In some embodiments, time series clustering can reduce the candidate time series data into a smaller set of candidate time series. In some examples, a candidate time series is randomly selected from each cluster. In some embodiments, different time series clustering algorithms are used that affect the selection of time series. For example, a dynamic time warping (DTW) approach calculates a distance for a pairwise similarity of candidate time series, and then performs K-means clustering. In another example, a cluster of candidate time series are selected, and the remaining candidate time series are grouped together into a large separate cluster.

According to some aspects, the data component identifies a relatively large set of candidate time series for the set of indicators, any of which can be a leading indicator for the target metric.

At operation 510, the system trains a machine learning model to predict the target time series data based on the candidate time series data. In some cases, the operations of this step refer to, or may be performed by, a training component as described with reference to FIG. 2.

According to some aspects, the data component provides the target time series data and the candidate time series data to the machine learning model. In some embodiments, the machine learning model predicts the target time series data based on the candidate time series data using a prediction network that includes temporal attention weights corresponding to a set of rolling time windows and candidate attention weights corresponding to the set of candidate metrics as described with reference to FIG. 3.

In some embodiments, rolling windows of candidate time series are provided as input to the machine learning model, where each rolling window is a set of successive time periods. In some embodiments, the size of each rolling window is tunable (for example, by a user). Each rolling window is used to predict the target time series data at a future time horizon d as described with reference to FIG. 3. According to some aspects, the future time horizon d can be one or more time periods that follow the rolling time window. In some cases, the choice of the size of the rolling window and the time horizon d are adjusted or customized by users. According to some aspects, the user provides the time horizon d to the data component via a time horizon input to a user interface presented by the data processing apparatus on a user device (such as the user device described with reference to FIG. 1), and the data component provides the time horizon d as input to the machine learning model.

According to some aspects, the user provides a first time horizon, a second time horizon, and a third time horizon to the data component via the time horizon input. According to some aspects, the second time horizon is less than the first time horizon. According to some aspects, the third time horizon is based on the first time horizon and the second time horizon. For example, in some cases, the third time horizon is equal to a difference between the first time horizon and the second time horizon. In some cases, the sum of the second time horizon and the third time horizon is less than the first time horizon.

In some embodiments, the training component trains the machine learning model to predict the target time series based on a candidate time series associated with a source indicator at the first time horizon. In some embodiments, the training component trains the machine learning model to predict the target time series based on a candidate time series associated with an intermediate indicator at the second time horizon. In some embodiments, the training component trains the machine learning model to predict the target time series based on a candidate time series associated with an intermediate indicator at the second time horizon.

According to some aspects, the training component computes a loss function by comparing the target time series data with the predicted target time series data. The term "loss function" refers to a function that impacts how a machine learning model is trained in a supervised learning model. Specifically, during each training iteration, the output of the model is compared to the known annotation information in the training data. The loss function provides a value (the "loss") for how close the predicted annotation data is to the actual annotation data. After computing the loss function, the parameters of the model are updated accordingly, and a new set of predictions are made during the next iteration.

According to some aspects, one or more loss functions (e.g., mean squared error, mean absolute percentage error, sMAPE, or other loss functions) are used to evaluate model robustness and performance. In some embodiments, as a measure of error (i.e., accuracy), an output of the machine learning model can be evaluated for each time horizon d according to sMAPE:

$$\frac{100\%}{n} \sum_{t=1}^{n} \frac{|F_t - A_t|}{|F_t| + |A_t|} \tag{3}$$

In some embodiments, F and A are predicted and actual values on the candidate time series data. In some embodiments, the sMAPE value is between 0 and 1.

According to some aspects, the training component updates the temporal attention weights and the candidate attention weights based on the loss function. In some cases, the operations of this step refer to, or may be performed by, a training component as described with reference to FIG. 3.

Aspects of the training of the machine learning model are described in further detail with reference to FIGS. 5 and 6 of U.S. patent application Ser. No. 17/329,934. However, modifications such as modifications to the training objective function may be made to the processes described therein.

At operation 515, the system computes a first predictivity value, a second predictivity value, and a third predictivity value based on the machine learning model, where the first predictivity value indicates that a source indicator from the set of indicators is predictive of the target metric, where the second predictivity value indicates that an intermediate indicator from the set of indicators is predictive of the target metric, and wherein the third predictivity value indicates that the source indicator is predictive of the intermediate indicator In some cases, the operations of this step refer to, or may be performed by, a prediction component as described with reference to FIG. 2.

According to some aspects, the prediction component generates predictivity values for the set of indicators, respectively, based on the machine learning model. For example, the prediction component assigns a numerical value to a weight that the indicator receives in the output of the machine learning model, where the weight indicates how predictive of a target output the indicator is. In some cases, the prediction component ranks the set of indicators based on the predictivity values. For example, the prediction component ranks the set of indicators according to the assigned numerical value.

According to some aspects, the machine learning model predicts target time series data at the first time horizon, the second time horizon, and the third time horizon. In some cases, the prediction component identifies a first subset of the set of indicators based on the machine learning model, where the first subset includes an indicator of the set of indicators that is predictive of the target time series data at the first time horizon. In some cases, the prediction component identifies a second subset of the set of indicators based on the machine learning model, where the second subset includes an indicator of the set of indicators that is predictive of the target time series data at the second time horizon. In some cases, the prediction component identifies a third subset of the set of indicators based on the machine learning model, where the third subset includes an indicator of the set of indicators that is predictive of an indicator of the second subset of indicators at the third time horizon.

In some cases, the prediction component identifies an indicator included in both the first subset and the third subset as a source indicator, and identifies an indicator included in the second subset that is predicted by an indicator in the third subset as an intermediate indicator.

According to some aspects, the prediction component computes a first predictivity value for the source indicator according to the weight of the candidate time series corresponding to the source indicator with respect to the predicted target time series data for the target metric. According to some aspects, the prediction component computes a second predictivity value for the intermediate indicator according to the weight of the candidate time series corresponding to the intermediate indicator with respect to the predicted target time series data for the target metric. According to some aspects, the prediction component computes a third predictivity value for the source indicator according to the weight of the candidate time series corresponding to the source indicator with respect to the predicted target time series data for the intermediate indicator.

According to some aspects, the first time horizon, the second time horizon, and the third time horizon are identified based on the machine learning model. For example, in some cases, the prediction model identifies prediction error values (e.g., sMAPE values) for each of a set of time horizons, where the first time horizon, the second time horizon, and the third time horizon are identified based on the prediction error values. In an example, after the prediction component identifies the prediction error values for the set of time horizons, the prediction component compares a prediction error value corresponding to the user-provided first time horizon to a prediction error value for a time horizon that is within a predetermined or user-provided amount of time periods of the first time horizon.

In an illustrative example, the user provides a first time horizon of 30 days. The prediction component identifies that the prediction error value at a time horizon of 27 days is lower than the prediction error value at the first time horizon of 30 days. The prediction component can automatically set the first time horizon to 27 days instead of 30 days, or can make a recommendation to the user that the user reset the first time horizon accordingly.

According to some aspects, the prediction component similarly identifies the third time horizon based on the machine learning model. According to some aspects, the prediction component identifies the second time horizon based on the identified first time horizon and third time horizon. For example, in some embodiments, the second time horizon is equal to a difference between the first time horizon and the third time horizon.

According to some aspects, the prediction component identifies a set of indicator pairs, where each of the set of indicator pairs includes a first element and a second element. In some cases, the prediction component identifies a source indicator as the first element of the indicator pair. In some cases, the prediction component identifies an intermediate indicator as the second element of the indicator pair. In some cases, the prediction component identifies a target metric as the second element of the indicator pair. According to some aspects, the prediction component ranks the set of indicator pairs. For example, in some cases, the prediction component calculates a first sMAPE value SM1 for the first time horizon and a third sMAPE value SM3 for the third time horizon corresponding to the first element, and a second sMAPE value SM2 for the second time horizon corresponding to the second element, and calculates a score for the indicator pair including the first element and the second element:

$$\text{Score} = \left[\frac{(1 - SM1)}{r_1}\right] \cdot \left[\frac{(1 - SM2)}{r_2}\right] \cdot \left[\frac{(1 - SM3)}{r_3}\right] \qquad (4)$$

According to some aspects, $r_1$ is the rank of the first element at the first time horizon, $r_2$ is the rank of the second element at the second time horizon, and $r_3$ is the rank of the first element at the third time horizon. According to some aspects, the prediction component ranks each indicator pair according to their score. According to some aspects, the source indicator and the intermediate indicator are identified based on the ranking of an associated indicator pair. For example, a highest ranked indicator pair indicates a most predictive source indicator and intermediate indicator pair.

At operation 520, the system displays a portion of the candidate time series data corresponding to the intermediate indicator and the source indicator based on the first predictivity value, the second predictivity value, and the third predictivity value. In some cases, the operations of this step refer to, or may be performed by, a data component as described with reference to FIG. 2.

For example, in some cases, the user interface displays the candidate time series corresponding to the source indicator and the intermediate indicator that respectively correspond to the first predictivity value, the second predictivity value, and the third predictivity value. By displaying the candidate time series corresponding to the source indicator and the intermediate indicator, the data processing apparatus visualizes for the user an interrelated group of key performance indicators for the target metric.

According to some aspects, a graph component of the data processing apparatus (such as the graph component described with reference to FIG. 2) generates a graph including the target metric and the plurality of indicators based on the first predictivity value, the second predictivity value, and the third predictivity value, where the graph includes a first edge between the source indicator and the target metric, a second edge between the intermediate indicator and the target metric, and a third edge between the source indicator and the intermediate indicator. According to some aspects, the length of the first edge, the second edge, and the third edge respectively correspond to the first time horizon, the second time horizon, and the third time horizon, which in turn respectively correspond to the first predictivity value, the second predictivity value, and the third predictivity value.

According to some aspects, the graph includes the set of indicators and the target metric. According to some aspects, an indicator pair is represented in the graph as a closed sub-graph. According to some aspects, each closed sub-graph included in the graph is associated with a ranking of the associated indicator pair. According to some aspects, the graph component provides the graph to the user via the user interface displayed by the user device. By generating the graph, the data processing apparatus is able to provide the user with an intuitive visualization of the key groups of interrelated leading indicators for a target metric. A graph is illustrated with reference to FIG. 6.

According to some aspects, the data component collects additional time series data for the intermediate indicator and the source indicator based on the first predictivity value, the second predictivity value, and the third predictivity value.

For example, according to some aspects, after the prediction component identifies the first predictivity value, the second predictivity value, and the third predictivity value for the source indicator and the intermediate indicator, respectively, the data component can monitor or track a website, software application, etc. (for example, via API calls) to obtain additional time series data for the source indicator and the intermediate indicator. According to some aspects, the prediction component uses the additional time series data to generate a prediction for the target metric. Accordingly, the additional data allows the data processing apparatus to iteratively refine the prediction of the target metric and the identification of the source indicator and the intermediate indicator, providing the user with a greater and more accurate accounting of an interrelated group of leading indicators for a target goal.

Figure 6:
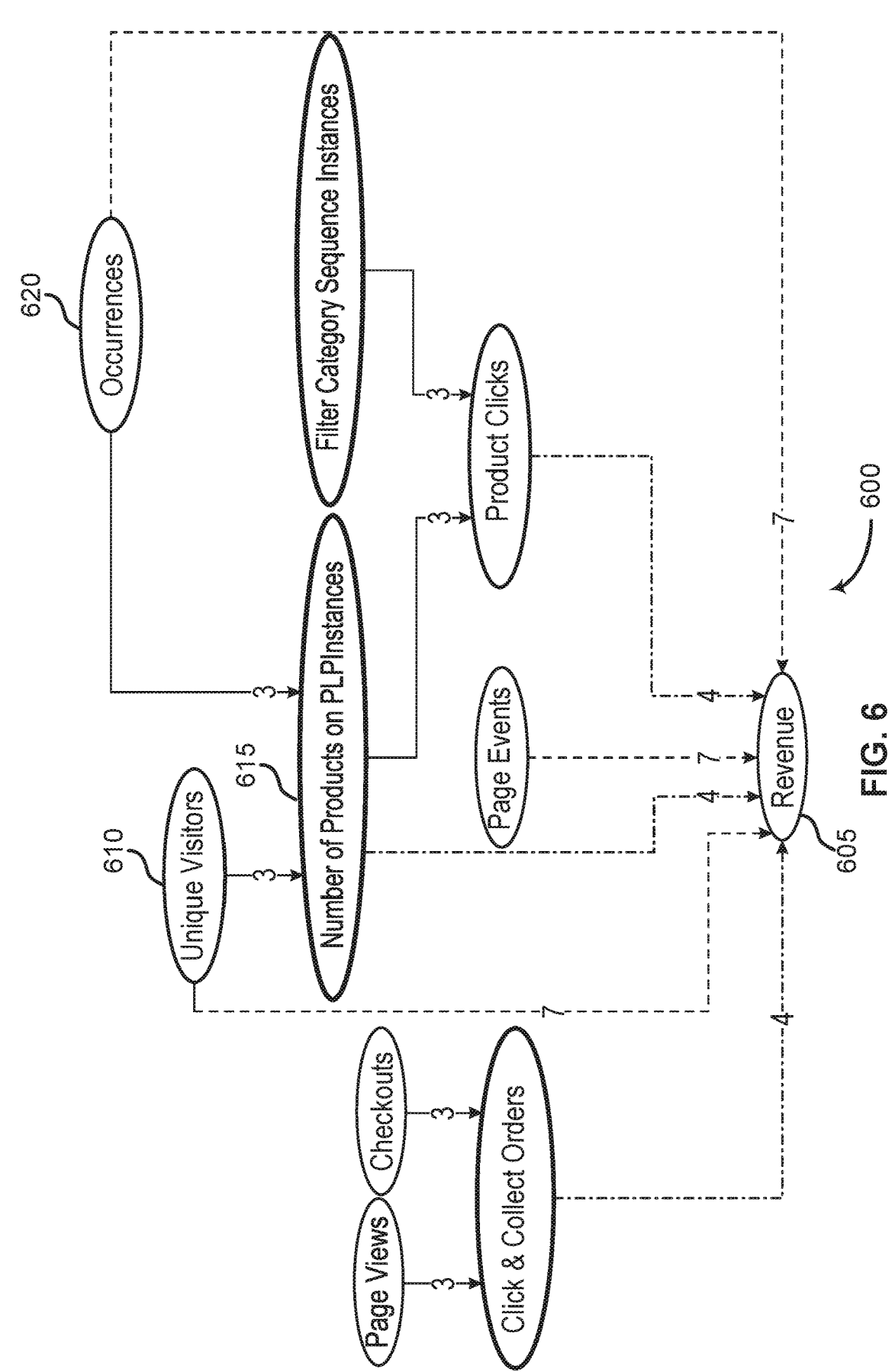
FIG. 6 shows an example of a graph according to aspects of the present disclosure.

FIG. 6 shows an example of a graph 600 according to aspects of the present disclosure. Referring to FIG. 6, graph 600 is an example of at least a portion of a graph generated as described with reference to FIG. 5. Graph 600 includes a node corresponding to a target metric 605 ("Revenue"), nodes corresponding to a set of indicators (including "Unique Visitors", "Occurrences", "Page Views", "Checkouts", etc.), and edges connecting the various nodes in various manners, with lengths (e.g., 3, 4, and 7) corresponding to various time horizons associated with the various nodes.

Graph 600 provides an example of how a source indicator and an intermediate indicator are identified according to some aspects. For example, the graph illustrates a set of indicators that include Page Views, Checkouts, Click and Collect Orders, Unique Visitors, Number of Products on PLP Instances, Page Events, Occurrences, Filter Category Sequence Instances, and Product Clicks.

In the example, the prediction component described with reference to FIG. 2 identifies Unique Visitors, Page Events, and Occurrences as indicators included in a first subset of indicators as described with reference to FIG. 5 because they are predictive of a target metric Revenue at a first time horizon of seven days. In the example, the prediction component identifies Click and Collect Orders, Number of Products on PLP Instances, and Product Clicks as indicators included in a second subset of indicators as described with reference to FIG. 5 because they are predictive of the target metric Revenue at a second time horizon of four days.

Furthermore, in the example, the prediction component identifies Page Views and Checkouts as indicators included in a third subset of indicators as described with reference to FIG. 5 because they are predictive of Click and Collect Orders at a third time horizon of three days, identifies Unique Visitors and Occurrences as indicators included in the third subset of indicators because they are predictive of Number of Products on PLP instances at the third time horizon, and identifies Number of Products on PLP Instances and Filter Category Sequence Instances as indicators included in the third subset of indicators because they are predictive of Product Clicks at the third time horizon.

Accordingly, in the example, the prediction component identifies Unique Visitors and Occurrences as source indicators because they belong to both the first subset and the third subset (e.g., they are predictive of both the target metric at the first time horizon and a member of the second subset at the third time horizon), and identifies Number of Products on PLP Instances as a source indicator because it both belongs to the second subset and is predicted by a member of the third subset.

Graph 600 also includes two closed subgraphs comprising a source indicator, an intermediate indicator, and a target metric as described with reference to FIG. 5. The first closed subgraph includes source indicator 610 ("Unique Visitors"), intermediate indicator 615 ("Number of Products on PLP Instances"), and target metric 605 ("Revenue"). As shown by graph 600, Unique Visitors is predictive of Revenue at the first time horizon of seven days and is predictive of Number of Products on PLP Instances at the third time horizon of three days, while Number of Products on PLP Instances is predictive of Revenue at the second time horizon of four days.

Likewise, the second closed subgraph includes source indicator 620 ("Occurrences"), intermediate indicator 615 ("Number of products on PLP instances"), and target metric 605 ("Revenue"). As shown by graph 600, Occurrences is predictive of Revenue at the first time horizon of seven days and is predictive of Number of Products on PLP Instances at the third time horizon of three days, while Number of Products on PLP Instances is predictive of Revenue at the second time horizon of four days.

Graph 600 thereby provides a visualization for a user to intuitively identify groups of interrelated leading indicators and metrics so that the leading indicators may be more effectively tracked and monitored toward achieving a target goal.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for data processing, comprising:
identifying, by a data component, target time series data for a target metric and candidate time series data for a plurality of indicators predictive of the target metric, wherein each of the plurality of indicators comprises a metric different from the target metric;
training, by a training component, a machine learning model to predict the target time series data based on the candidate time series data;
identifying, by a prediction component, a plurality of indicator pairs including a first pair comprising a source indicator from the plurality of indicators and the target metric, a second pair comprising an intermediate indicator from the plurality of indicators and the target metric, and a third pair comprising the source indicator and the intermediate indicator;
computing, by the prediction component, a first predictivity value for the first pair, a second predictivity value for the second pair, and a third predictivity value for the third pair based on the machine learning model and the plurality of indicator pairs, wherein the first predictivity value indicates that the source indicator from the plurality of indicators is predictive of the target metric, wherein the second predictivity value indicates that the intermediate indicator from the plurality of indicators is predictive of the target metric, and wherein the third predictivity value indicates that the source indicator is predictive of the intermediate indicator; and
generating, by a graph component, a graph including the target metric and the plurality of indicators based on the first predictivity value, the second predictivity value, and the third predictivity value, wherein the graph includes a first edge between the source indicator and the target metric, a second edge between the intermediate indicator and the target metric, and a third edge between the source indicator and the intermediate indicator.

2. The method of claim 1, further comprising:
displaying, by a user interface, a portion of the candidate time series data corresponding to the intermediate indicator and the source indicator based on the first predictivity value, the second predictivity value, and the third predictivity value.

3. The method of claim 1, further comprising:
collecting, by the data component, additional time series data for the intermediate indicator and the source indicator based on the first predictivity value, the second predictivity value, and the third predictivity value; and
generating, by the prediction component, a prediction for the target metric based on the additional time series data.

4. The method of claim 1, further comprising:
identifying, by the prediction component, a first time horizon, wherein the source indicator is predictive of the target metric at the first time horizon;
identifying, by the prediction component, a second time horizon that is less than the first time horizon, wherein the intermediate indicator is predictive of the target metric at the second time horizon; and
identifying, by the prediction component, a third time horizon based on the first time horizon and the second time horizon, wherein the source indicator is predictive of the intermediate indicator at the third time horizon.

5. The method of claim 4, wherein:
the third time horizon is equal to a difference between the first time horizon and the second time horizon.

6. The method of claim 4, wherein:
the first time horizon, the second time horizon, and the third time horizon are identified based on the machine learning model.

7. The method of claim 6, further comprising:
identifying, by the prediction component, prediction error values for each of a plurality of time horizons, wherein the first time horizon, the second time horizon, and the third time horizon are identified based on the prediction error values.

8. The method of claim 4, further comprising:
receiving, by the prediction component, time horizon input from a user, wherein the first time horizon, the second time horizon, and the third time horizon are identified based on the time horizon input.

9. The method of claim 1, further comprising:
generating, by the prediction component, predictivity values for the plurality of indicators, respectively, based on the machine learning model; and
ranking, by the prediction component, the plurality of indicators based on the predictivity values.

10. The method of claim 1, further comprising:
ranking, by the prediction component, the plurality of indicator pairs.

11. A method for data processing, comprising:
identifying, by a data component, target time series data for a target metric and candidate time series data for a plurality of indicators predictive of the target metric;
training, by a training component, a machine learning model to predict the target time series data based on the candidate time series data;
identifying, by a prediction component, a plurality of indicator pairs including a first pair comprising a source indicator from the plurality of indicators and the target metric, a second pair comprising an intermediate indicator from the plurality of indicators and the target metric, and a third pair comprising the source indicator and the intermediate indicator;
identifying, by the prediction component, a first time horizon for the source indicator from the plurality of indicators, wherein the source indicator is predictive of the target metric at the first time horizon;
identifying, by the prediction component, a second time horizon for the intermediate indicator from the plurality of indicators, wherein the intermediate indicator is predictive of the target metric at the second time horizon;
identifying, by the prediction component, a third time horizon for the source indicator, wherein the source indicator is predictive of the intermediate indicator at the third time horizon; and generating, by a graph component, a graph including the target metric and the plurality of indicators based on the first time horizon, the second time horizon, and the third time horizon, wherein the graph includes a first edge between the source indicator and the target metric, a second edge between the intermediate indicator and the target metric, and a third edge between the source indicator and the intermediate indicator.

12. The method of claim 11, wherein:

the second time horizon is less than the first time horizon; and the third time horizon is based on the first time horizon and the second time horizon.

13. The method of claim 12, wherein:

the third time horizon is equal to a difference between the first time horizon and the second time horizon.

14. The method of claim 11, wherein:

the first time horizon, the second time horizon, and the third time horizon are identified based on the machine learning model.

15. The method of claim 14, further comprising:

identifying, by the prediction component, prediction error values for each of a plurality of time horizons, wherein the first time horizon, the second time horizon, and the third time horizon are identified based on the prediction error values.

16. The method of claim 11, further comprising:

receiving, by the prediction component, time horizon input from a user, wherein the first time horizon, the second time horizon, and the third time horizon are identified based on the time horizon input.

17. The method of claim 16, further comprising:

generating, by the prediction component, predictivity values for the plurality of indicators, respectively, based on the machine learning model; and ranking, by the prediction component, the plurality of indicators based on the predictivity values.

18. The method of claim 11, further comprising:

identifying, by the prediction component, a plurality of indicator pairs, wherein each of the plurality of indicator pairs includes a first element and a second element; and ranking, by the prediction component, the plurality of indicator pairs, wherein the source indicator and the intermediate indicator are identified based on the ranking.

19. An apparatus for data processing, comprising:

a processor;

a memory storing instructions executable by the processor;

a data component executable by the processor to identify target time series data for a target metric and candidate time series data for a plurality of indicators predictive of the target metric;

a training component executable by the processor to train a machine learning model to predict the target time series data based on the candidate time series data;

a prediction component executable by the processor to;

identify a plurality of indicator pairs including a first pair comprising a source indicator from the plurality of indicators and the target metric, a second pair comprising an intermediate indicator from the plurality of indicators and the target metric, and a third pair comprising the source indicator and the intermediate indicator, and compute a first predictivity value for the first pair, a second predictivity value for the second pair, and a third predictivity value for the third pair based on the machine learning model and the plurality of indicator pairs, wherein the first predictivity value indicates that the source indicator from the plurality of indicators is predictive of the target metric, wherein the second predictivity value indicates that the intermediate indicator from the plurality of indicators is predictive of the target metric, and wherein the third predictivity value indicates that the source indicator is predictive of the intermediate indicator; and a graph component configured to generate a graph including the target metric and the plurality of indicators based on the first predictivity value, the second predictivity value, and the third predictivity value, wherein the graph includes a first edge between the source indicator and the target metric, a second edge between the intermediate indicator and the target metric, and a third edge between the source indicator and the intermediate indicator.

20. The apparatus of claim 19, further comprising:

a user interface configured to display a portion of the candidate time series data corresponding to the source indicator and the intermediate indicator based on the first predictivity value, the second predictivity value, and the third predictivity value.

* * * * *